METHOD OF MAKING A MAGNETIC TRANSDUCER HEAD

Filed March 23, 1962 2 Sheets-Sheet 1

INVENTOR
ROBERT W. BROUGHTON

BY Edward M. Farrell

ATTORNEY

METHOD OF MAKING A MAGNETIC TRANSDUCER HEAD

Filed March 23, 1962 2 Sheets-Sheet 2

United States Patent Office 3,242,556
Patented Mar. 29, 1966

3,242,556

METHOD OF MAKING A MAGNETIC TRANSDUCER HEAD

Robert W. Broughton, Philadelphia, Pa., assignor to Sperry Rand Corporation, New York, N.Y., a corporation of Delaware Filed Mar. 23, 1962, Ser. No. 181,964
1 Claim. (Cl. 29—155.5)

Figures 1, 2, 3:
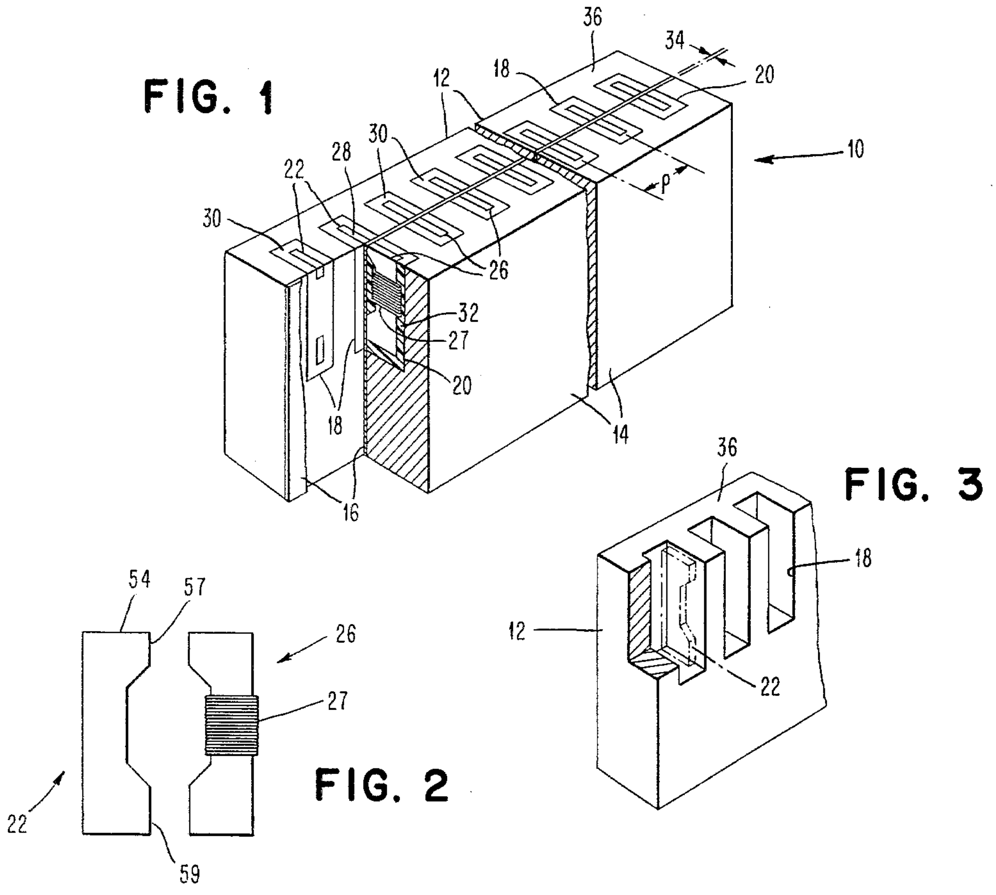

The invention relates to a magnetic transducer head for use with magnetic recording and reproducing equipment, and more particularly to a magnetic transducer head comprising a plurality of transducers, in the art generally called a multi-track or multi-channel head.

The mechanical construction of a single magnetic transducer head presents several difficult problems, mainly arising from the severe requirements as to the accuracy of the air gap between the pole pieces. The gap must be dimensionally very precise and extremely short, and the pole pieces forming the gap must be in exact alignment. These problems are multiplied in the construction of a multichannel head. An additional problem constitutes the pitch in a multichannel head, which must be very accurate. If the pitch, viz. the center distance between any two adjacent gaps, for a number of heads is not exactly the same then information recorded by one head cannot be read by another head.

Further, a multichannel head when used in cooperation with a magnetic storage drum must meet a severe requirement as to the flatness of the recording surface, viz. the surface which contains the gaps and faces the drum periphery. This recording surface must be flat within a few wave lengths of light in connection with the critical clearance between this surface and the drum periphery.

A multichannel head used for contact recording such as with a magnetic tape should have a wear resistant recording surface, not only to obtain reasonable durability but also to prevent minute wear-particles from being caught in the air gaps since this influences the recording quality unfavorably.

In a known construction, the multichannel head comprises two halves cast together. The pole pieces for one half, while held in spaced side-by-side arrangement, are embedded in a block of a non-conductive material, usually a synthetic resin. A second half, containing the complementary pole pieces, is manufactured in the same way, placed against the first half and subsequently cast together with the first half. An important disadvantage of a multichannel head obtained in this way is that the two halves cannot be separated, so that in case of a defect in one channel, the whole head becomes useless. A more important disadvantage of a multichannel head thus obtained is that the two halves are left and right halves. This means that dimensional deviations may add up and decrease the quality of the head. A further disadvantage is that the embedding material is relatively soft and may wear rapidly. Also intolerable dimensional changes may occur as a result of thermal expansion or moisture absorption.

In another known construction of a multichannel head the pole pieces in each half are fitted exactly into and held in place by press fit by recesses machined in each half. In view of the required extreme accuracy of each gap and of the pitch of the gaps, very close machining tolerances must be maintained for the recesses. Heads obtained in this way are therefore expensive and cannot be made by series production methods.

It is an object of the invention to provide an improved multi-channel head and the method of making it in which the alignment and dimensions of each individual gap and the alignment of the pertaining pole pieces is accurately controlled.

It is a further object of the invention to provide an improved multi-channel magnetic head and the method of making it in which the channel pitch is accurately controlled.

It is a further object of the invention to provide an improved multi-channel head and the method of making it consisting of two interchangeable halves.

It is a further object of the invention to provide an improved multi-channel head and the method of making it consisting of two halves which have mirror symmetry.

It is a still further object of the invention to provide a multichannel magnetic head and the method of making it which may be used for recording on a magnetic storage drum.

It is a still further object of the invention to provide an inexpensive multichannel magnetic head and an economic method for making it.

It is a still further object of the invention to provide an improved multichannel magnetic head and the method of making it which has high resistance against wear.

According to the invention two halves forming a magnetic head are each provided with a number of recesses. The dimensions of a recess are greater than the dimensions of a pole piece, with or without an excitation coil. In each recess of one half there is secured by casting means a pole piece, and similarly, in each recess of the other half a complementary pole piece carrying an excitation coil. The exact location and position of each pole piece in a recess and the exact pitch is obtained by gauge means. The gauge means make it possible to position a pole piece in mirror symmetry with respect to its complementing pole piece. The two halves thus obtained are joined, forming a multichannel head with exactly aligned pole pieces and exact pitch.

Figures 4, 4A, 5:
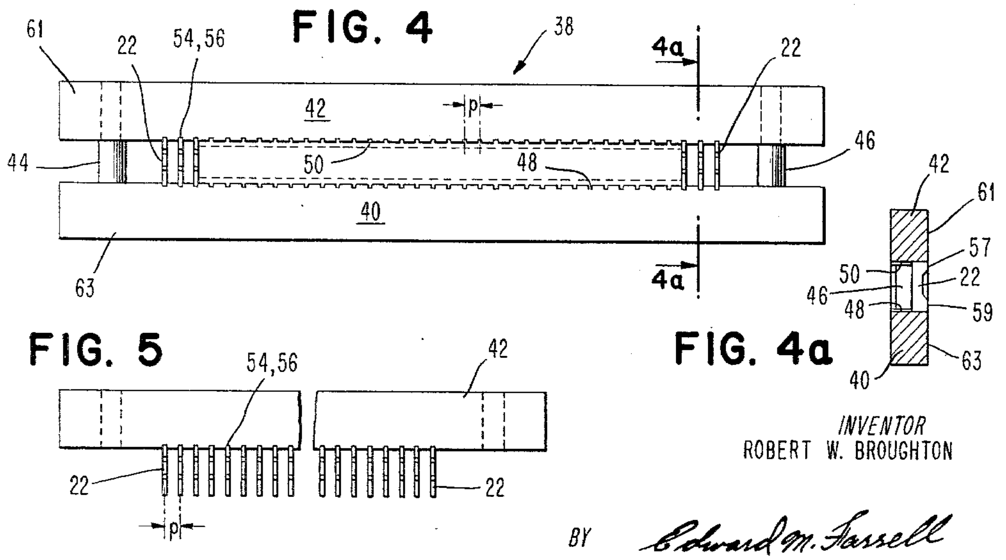
Figure 6:
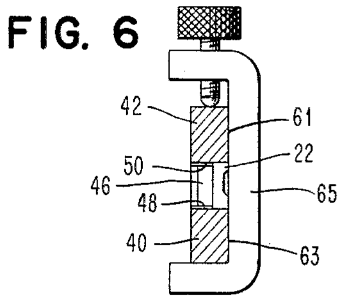
Figure 7:
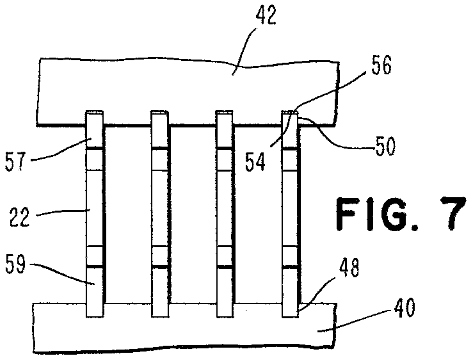
Figures 8, 9:
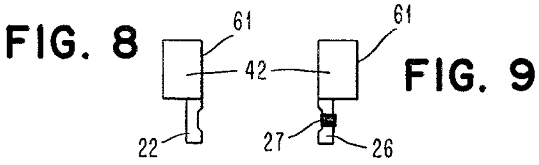
Figure 10:
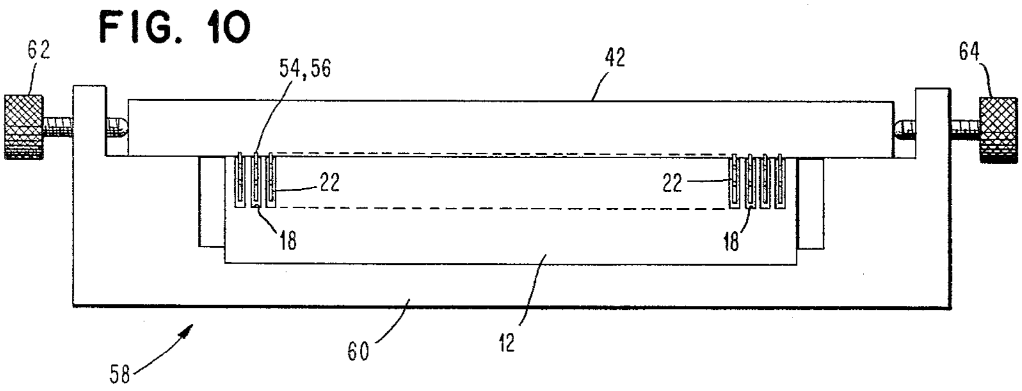
Figure 11:
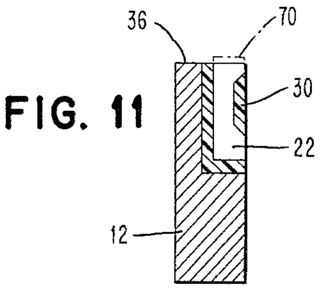
Figure 12:
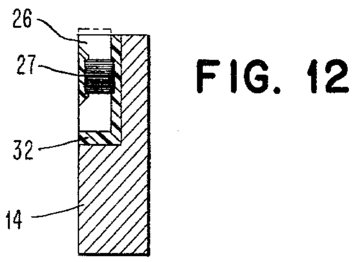

In order that the various features of the invention may be more readily understood a preferred embodiment thereof and a preferred method of manufacturing it will be described by way of example and with reference to the accompanying drawings in which:

FIG. 1 illustrates a completed multichannel magnetic transducer head according to the invention, partially sectioned, FIG. 2 illustrates a pole piece with its complementary pole piece, FIG. 3 illustrates a detail of a multichannel head partially sectioned, FIG. 4 illustrates a gauge as used in the manufacture of a magnetic head according to the invention, FIG. 4*a* illustrates a side cross-sectional view of the gauge of FIG. 4, taken along lines 4*a*—4*a* of FIG. 4, FIG. 5 illustrates a part of the gauge during a manufacturing stage, FIG. 6 illustrates an auxiliary tool containing the gauge of FIG. 4 during a stage of manufacture, FIG. 7 illustrates on an enlarged scale a detail of FIG. 5, FIG. 8 illustrates a side view of the gauge of FIG. 4 holding a number of pole pieces, FIG. 9 illustrates a side view of the gauge holding a number of complementary pole pieces, FIG. 10 illustrates an auxiliary tool during a stage of manufacture, FIG. 11 illustrates in cross section one half of a magnetic head according to the invention, FIG. 12 illustrates in cross-section the complementary half of the half illustrated in FIG. 11.

Referring particularly to FIG. 1 there is shown a multichannel head 10 according to the invention. The head 10 comprises two halves or carcasses 12 and 14. Both carcasses may be made of metal, for example aluminum. The carcasses 12 and 14 are connected together by suitable means, not shown in the drawing, such as bolts. The carcasses are separated by a thin foil of suitable materal 16 whose thickness determines the length of the gap of each channel. Carcass 12 includes a number of recesses 18, carcass 14, a number of recesses 20. Carcass 12 supports in each recess 18 a pole piece 22, carcass 14 supports in each recess 20 a complementary pole piece 26 provided with an excitation coil 27 (FIG. 2).

Each pole piece 22 is secured in its pertaining recess 18 by means of a small mass of a casting material 30, such as resin. Likewise each pole piece 26 is secured in its pertaining recess 20 by a small mass of casting material 32, which may be also resin.

In FIGURE 1, for the purpose of illustration, the mass of casting material is shown considerably greater than it is in reality. In reality the thickness of the resin filling the space between a pole piece and the walls of its recess is very small and of the order of 0.01 of an inch.

Each pole piece 22 forms with a complementary pole piece 26 a ringhead or channel 28 with a gap 34. The pitch, viz., the center distance between two adjacent channels is indicated with *p*.

The particular advantages of a multichannel head according to the invention will readily be understood from its construction as described above. The recording surface 36 which is almost entirely metal, can be machined accurately according to known methods such as grinding, polishing, and lapping so as to meet the severe requirement as to flatness. This extreme flatness is important when the head is used for recording on a magnetic drum in which case a very critical clearance must be maintained to ensure efficient magnetic coupling between the recording gaps and the spots of remanent magnetism on the drum periphery.

Further, since the mass of the casting material surrounding a pole piece is so small, dimensional changes as a result of moisture absorption and/or thermal expansion are negligible.

Since the critical recording surface 36 of the head is of metal, the wear is relatively slight when the head is used for contact recording such as recording on tape.

In the manufacture of a multichannel head according to the invention and as described above, an important means is a gauge as will be described hereinafter. The gauge serves to hold temporarily the pole pieces in the proper spaced side-by-side relationship until thy have become definitely secured in their respective recess. FIG. 4 shows a gauge 38 suitable for the manufacture of the multichannel head as described.

The gauge 38 comprises two parallel bars 40 and 42. Bar 40 is provided with two guide studs 44 and 46, over which bar 42 may slide and thus be kept in exact parallel relationship with bar 40. Bar 40 is provided with a number slots 48, bar 42 with a number of slots 50. The slots 48 and 50 are very accurately machined so that their pitch is exactly that of the required pitch *p* of the multichannel head to be manufactured. Further, the slots 48 and 50 are in exact alignment with each other.

In the manufacture of a multichannel head according to the invention, a number of pole pieces 22 is provided at one extremity 54 (see FIG. 7) with a very small quantity of cement 56. FIG. 7, which is drawn on an enlarged scale, shows that the cement 56 does not coat the side faces of a pole piece. When provided with cement, the pole pieces 22 are placed in between the bars 40 and 42 of the gauge 38, the cemented extremity 54 of the pole pieces being inserted in the slots of bar 42. The pole pieces are placed at one side of the gauge so that the gap portions 57 and 59 are flush with the faces 61 and 63 of bar 40 and 42, respectively, as shown in FIG. 4*a*. The gauge containing the pole pieces is placed in a clamp 65 as illustrated by FIG. 6, in which the cement 56 is left to dry. After drying, the gauge is taken out of the clamp. Bar 42 is carefully removed from bar 40, the pole pieces 22 being held in place within bar 42 by the hardened cement. FIG. 5 shows the bar 42 holding a number of pole pieces 22.

Bar 42 carrying the pole pieces is now placed in a tool 58, illustrated by FIG. 10. The tool 58 comprises a support 60 which is adapted to receive and hold in position a carcass such as 12. The bar 42 holding the pole pieces 22 is placed on the support 58 such that each recess 18 in carcass 12 receives a pole piece. By means of the adjusting screws 62 and 64 the bar may be displaced carefully to accurately position the pole pieces with respect to the walls of the recesses. When the pole pieces are exactly positioned, a suitable casting resin 30 is poured into each recess 18. After curing of the resin the cement 56 holding the pole pieces 22 at their extremity 54 in bar 42 is dissolved and the bar 42 is removed from tool 58. Portions 70 of the pole pieces 22 which may protrude from the surfaces 36 and 68 of the carcass 12 are ground accurately flush with these surfaces (FIG. 11).

Exactly the same method as described above in the manufacture of carcass 12 is followed for the manufacture of the complementary carcass 14 containing the complementary pole pieces 26 which carry the excitation coil 27.

It is, however, particularly to be emphasized that the complementary pole pieces 26, must be placed in the same gauge 38 and in such a way that they would be in back-to-back relationship with the pole pieces 22 if these still would be in the gauge. In this way the very important advantage is obtained that the pole pieces 22 and the complementary pole pieces 26 are placed in mirror symmetry with respect to each other, so that exact alignment results.

If a pair of carcasses such as 12 and 14 is completed according to the method described, the carcasses are joined. Before joining the carcasses a thin foil 16 is placed between them. This foil serves to accurately define the size of the gaps, and also to exclude dirt and magnetizable material from the gap. The carcasses may be mechanically connected by suitable known means such as bolts.

Whereas in multichannel heads of known construction the exact alignment of the pole pieces is directly determined by the pitch and dimensions of the slots in the carcass in which the pole pieces are fitted, in the multichannel head according to the invention the alignment and pitch are only dependent on the accuracy with which the gauge 10 has been manufactured. The gauge, a simple tool in itself, can be machined with great accuracy. As the gauge may be used repeatedly much effort and expense is justified in its very accurate manufacture.

According to the invention, the exact location and pitch of the pole pieces in any number of carcasses may be obtained in an inexpensive way. Also, interchangeability of all carcasses manufactured with the same gauge is guaranteed since the pole pieces in one carcass are in mirror symmetrical position with their complementary pole pieces of the other carcass. This means that any two carcasses may be joined to form a multichannel head. In case a carcass contains a defective channel, the carcass may be replaced with a good one without any risk of misalignment of channels or mismatching of pitch. Also, the method according to the invention lends itself readily to series production methods.

The embodiment of the invention in which an exclusive property or privilege is claimed are defined as follows:

In the manufacture of a multichannel magnetic transducer head for magnetic recording purposes of the type comprising two substantially symmetrical members, one member supporting a plurality of pole pieces, the other member supporting a plurality of complementary pole pieces, each pole piece forming with its complementary pole piece a recording channel, the steps of machining a plurality of spaced recesses in each of said members, each recess of said one member having larger dimensions than a pole piece and each recess of said other member having larger dimensions than a complementary pole piece, providing a gauge, said gauge comprising a fixed lower bar and a detachable top bar, said lower bar and said top bar being disposed for parallel guided motion with respect to each other, said lower bar and top bar being provided with complementary slots spaced like said spaced recess and adapted to receive said pole pieces, positioning the top bar relative to said bottom bar to receive pole pieces, applying a hardenable adhesive to one extremity of each pole piece, inserting each of the pole pieces so treated into a set of said complementary slots with the treated end extending into the top bar slot, adjusting each individual pole piece so as to be in substantial alignment and in a first position in said slots, leaving said adhesive to harden, removing said pole pieces from said lower bar by means of said top bar, placing said top bar carrying said pole pieces on said one member such that each recess in said one member receives a pole piece, pouring curable resinous casting material in each recess to secure the pole piece therein, curing said casting material, dissolving the hardened adhesive thereby separating said top bar from the pole pieces, repositioning the top bar relative to said bottom bar to receive said plurality of complementary pole pieces repeating said steps with the complementary pole pieces to permanently assemble them in said other member machining said one and said other member so that the pole pieces are accurately flush with the boundary planes of said one and said other member, respectively, and thereby defining on each member a recording surface and a gap defining surface, and joining said one and said other member with said gap defining surfaces in confronting relation.

References Cited by the Examiner

UNITED STATES PATENTS

| | | | |
|---|---|---|---|
| 1,325,325 | 12/1919 | Janke | 29—205 |
| 2,743,507 | 5/1956 | Kornei | 29—155.5 |
| 2,839,614 | 6/1958 | Merrill | 179—100.2 |
| 2,888,522 | 5/1959 | McCutchen et al. | 179—100.2 |
| 2,915,812 | 12/1959 | Rettinger | 29—155.5 |
| 2,985,948 | 5/1961 | Peters | 29—423 XR |
| 3,049,790 | 8/1962 | Camras | 29—155.5 |

JOHN F. CAMPBELL, *Primary Examiner.*

S. SRAGOW, M. K. KIRK, R. W. CHURCH, *Examiners.*